July 18, 1950    J. F. O'BRIEN ET AL    2,515,256
ELECTRICAL OUTLET RECEPTACLE DEVICE
Filed March 29, 1946    2 Sheets-Sheet 1
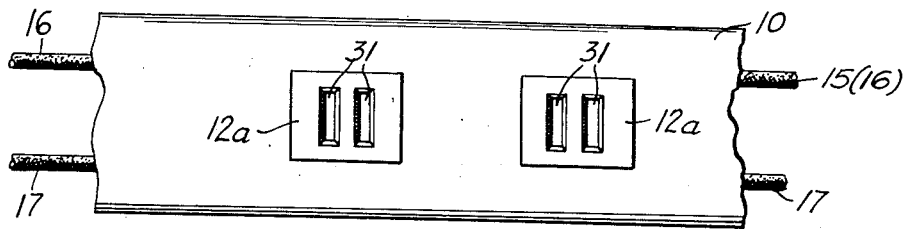
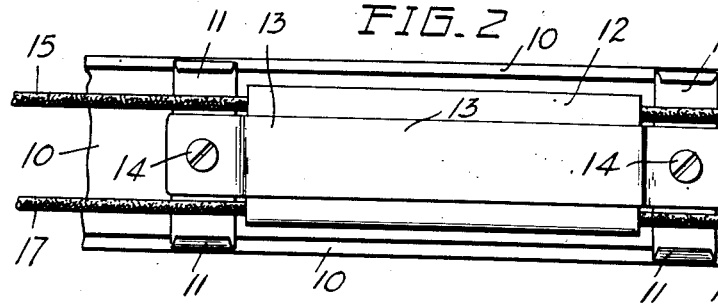
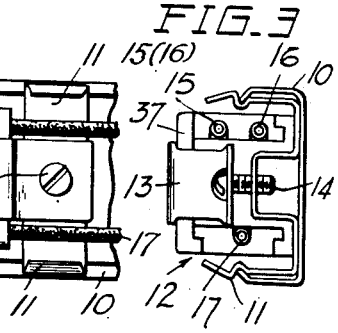
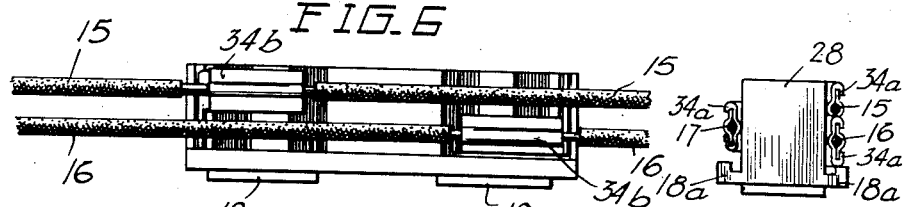
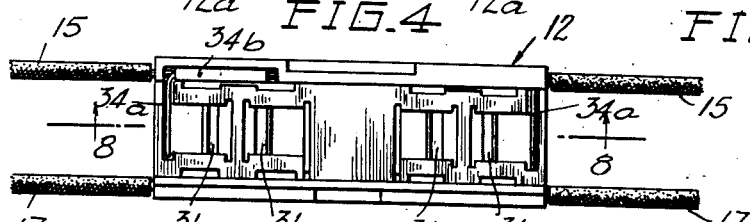
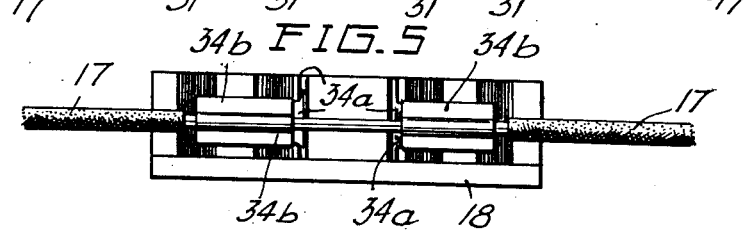
INVENTORS
JOSEPH F. O'BRIEN
EARL S. BOYNTON
BY
ATTORNEY

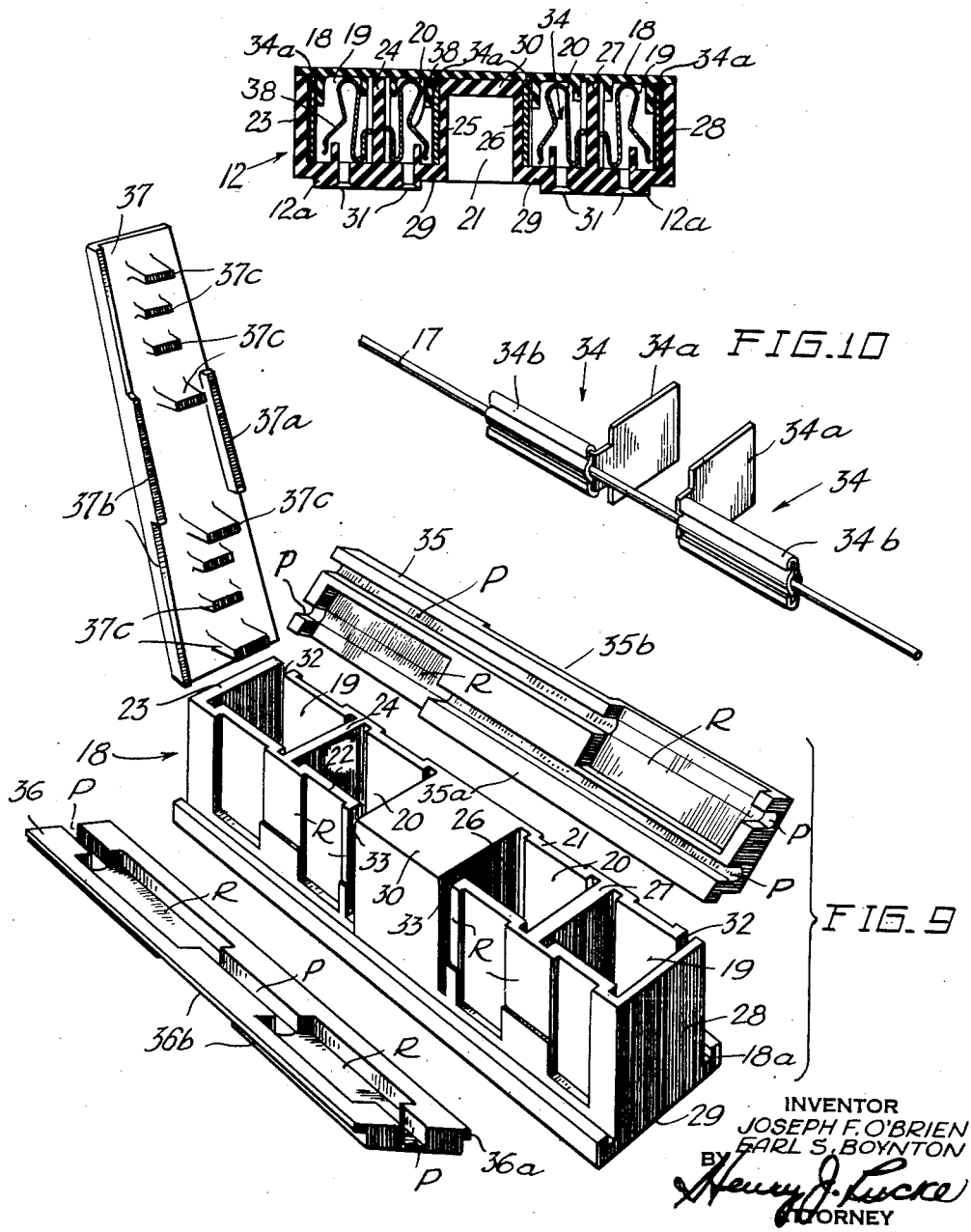

Patented July 18, 1950

2,515,256

UNITED STATES PATENT OFFICE 2,515,256

ELECTRICAL OUTLET RECEPTACLE DEVICE

Joseph F. O'Brien, Lebanon, and Earl S. Boynton, East Orange, N. J., assignors to John B. Pierce Foundation, New York, N. Y., a corporation of New York Application March 29, 1946, Serial No. 658,053

2 Claims. (Cl. 173—330)

1

The invention relates to electrical outlet receptacle devices employed in electrical wiring systems, for enabling plug-in or other temporary electrical interconnection with the system at desired locations thereof.

Pursuant to the invention, provision is made for effective interconnection of running electrical conductors with one or more sets of electrical outlet terminals at any given location or locations along a wiring system.

In our co-pending application for U. S. Patent Serial No. 650,346, filed February 26, 1946, and entitled "Electrical Conduit Wiring System" there is disclosed a type of wiring system in which embodiments of the present invention are very advantageously employed. There, running electrical conductors are mounted on one longitudinal part of a separable conduit housing, extending longitudinally therewith, and being supported, at least in part, by embodiments of the invention, which, in turn, are secured to the said part of the conduit housing. Such part of the conduit housing is arranged to fit with another longitudinally extending part, to provide an electrical conduit which protectively encloses the said electrical conductors and the said embodiments of the present invention.

While it is preferred that the conduit wiring system of our above-referred to copending application employ outlet receptacle devices constructed in accordance with the inventive concept here disclosed, such outlet receptacle devices have a wide range of usefulness in various other types of wiring systems and electrical installations.

An object of the invention is to provide an electrical outlet receptacle device which is relatively simple in construction and capable of economical manufacture, and yet one which may be quickly and easily installed in an electrical wiring system in good electrical and mechanical connection with running electrical conductors thereof.

Another object is to provide such an electrical outlet receptacle device wherein practically all structural parts thereof can be efficiently formed from a plastic composition material having desired electrical insulating properties, such as "Bakelite."

A feature of the invention resides in the provision of a hollow supporting block and of electrical interconnector contacts arranged to lie with outlet terminal portions thereof within the hollow interior of said supporting block and with electrical conductor connecting portions outside the same.

These and other objects and features of the invention will be more fully understood from the following detailed description of the preferred specific embodiment illustrated in the accompanying drawings, in which:

Fig. 1 is a front elevation of a fragmentary portion of an electrical conduit wiring system of the type above referred to, the illustrated portion including a preferred embodiment of the novel outlet receptacle device;

Fig. 2 is a rear elevation of the same;

Fig. 3 is an end elevation of the same;

Fig. 4 is a top plan view, with cover plate removed, of the outlet receptacle device of the foregoing figures, shown removed from the electrical conduit;

Fig. 5 is a view corresponding to that of Fig. 4, but being a side elevation of the device with side wall plate removed;

Fig. 6 is a view similar to that of Fig. 5, but illustrating the opposite side of the device, as reflected from a mirror plane;

Fig. 7 is a corresponding end view of the device;

Fig. 8 is a longitudinal section taken on the line 8—8, Fig. 4;

Fig. 9 is an exploded perspective view of the device, without the electrical interconnector contacts; and Fig. 10 is a detail perspective view of two of the electrical interconnector contacts, removed from the device proper and shown in connected relationship with an electrical conductor of the wiring system.

Referring to the drawings: the conduit wiring system of Figs. 1 through 3, in which the particular embodiment of the invention is employed, comprises a conduit cover part 10, which extends longitudinally and, together with a corresponding conduit base part (not shown), provides a longitudinally extending protective conduit for the electrical wiring and appurtenant devices of the system. As fully disclosed in our copending application Serial No. 650,346, above mentioned, the conduit cover part is adapted to snap into position on the base part, and to be retained thereon, by means of resilient clips 11, 11. The outlet receptacle device 12 is firmly attached to the inner face of the conduit cover part 10 by means of a rigid clamping strap 13, whose ends are secured to the resilient clips 11, 11, by means of screws 14, 14. The outlet faces 12a, 12a, of the receptacle device 12 protrude slightly through apertures provided therefor in the conduit cover part 10, being thus accessible for the plugging into the system of electrical utility appliances.

As illustrated, the system comprises three electrical conductors, two of which, indicated 15 and 16, respectively, are "live" and the third, 17, neutral, providing a common return. The system is of the type where two circuits exist, one of which may be switch-controlled. Accordingly, the illustrated outlet receptacle device 12 is of the double type, providing a pair of electrical outlets disposed side-by-side, see Fig. 1.

The outlet receptacle device 12 comprises a mounting block 18, which is hollow and, in the illustrated instance, elongated and compartmented. It may be advantageously molded from a plastic material having suitable electrical insulating qualities, e. g., "Bakelite," and, as shown in Fig. 9, has two sets of paired individual compartments 19 and 20 lying side-by-side.

The compartments 19 and 20, in both instances, are defined by side walls 21 and 22, end walls 23 and 24, intermediate partitions 25, 26, 27, and 28, and front wall 29, it being immaterial, except for strength and convenience in molding, whether the box-like intermediate septum 30 be closed at the rear, as shown, or at the front. It will be seen that the several compartments are open at corresponding ends thereof, that is, at the rear of the device. At their opposite ends, closed by the front wall 29, conventional plug-in openings 31, 31, provide for the insertion of plug blades (not shown) of electrical utility appliances, as hereinafter more fully described.

The side walls 21 and 22 of the mounting block 12 are apertured to receive electrical interconnector contacts. Thus, the slots 32, 32, in side wall 21 lead into the compartments 19, 19, respectively, of one set of compartments; and, similarly, the slots 33, 33, in side wall 22 lead into the compartments 20, 20, respectively, of the other set.

The electrical interconnector contacts are desirably as illustrated, and designated 34, in Fig. 10, wherein an outlet terminal portion 34a is disposed at substantially right angles to a sleeve connector portion 34b, of the type described fully in the co-pending application Serial Number 494,195, of Joseph F. O'Brien, filed July 10, 1943, entitled Conductor Unit for Electric Wiring Systems, now abandoned. They are inserted within the respective slots 32, 32 and 33, 33 so that their outlet terminal portions lie within the corresponding compartments of the mounting block 12 and their connector portions lie substantially against the outside faces of the corresponding side walls thereof, see especially Figs. 4, 5 and 6.

The device is provided with side wall members 35 and 36, respectively, which are separable from the mounting block 18. They are formed to fit closely against the outside faces of the side walls 21 and 22, respectively, of mounting block 18, retaining the interconnector contacts 34 in their above-described positions. Tongue and groove joinder is an advantageous manner of securing such side wall members in place, and, for this purpose the mounting block 18 may be provided with longitudinally extending and laterally placed groove formations 18a, 18a, designed to mate with complimentary tongue formations 35a and 36a of the respective side wall members. Both the outside faces of the mounting block 18 and inside faces of the respective side wall members 35 and 36 are desirably recessed, as indicated by R, Fig. 9, for better accommodating the interconnector contacts 34; and, for providing passage for the electrical conductors 15, 16, and 17 to engage the connector portions 34b of respective contacts, relatively narrow passage recesses P are formed longitudinally from end to end of the inner faces of such side wall members.

A cover member 37 is arranged to fit over the rear face of the mounting block 18, closing the open ends of the several compartments 19, 20 and 19, 20. Such cover member advantageously ties in with the side wall members 35 and 36 by means of a suitable tongue and groove arrangement, as, for example, that illustrated, where the tongue formations 37a and 37b of cover member 37 are arranged to mate with groove formations 35b and 36b, respectively, of the respective side wall members.

In the illustrated instance the outlet terminal arrangement is in accordance with the copending application Serial No. 538,642, of Joseph F. O'Brien and Earl S. Boynton, filed June 3, 1944, and entitled "Shock-Proof Connector Devices," U. S. Patent No. 2,419,585, patented April 29, 1947, though it should be realized that other conventional outlet terminal arrangements may be utilized if desired. Auxiliary contacts 38 of the outlet assembly of the particular formation peculiar to the aforementioned copending application are installed within the respective compartments 19, 20 and 19, 20 for cooperation with the outlet terminal portions 34a of the respective interconnector contacts 34. Such auxiliary contacts, being independent elements, are free within the compartments, and, for maintaining them in desired position, pairs of depending lugs 37c are provided on the inner face of the cover member 37, forming, in effect, nests for extremities of the auxiliary contacts. The auxiliary contacts 38 are resilient and are positioned and held in the respective compartments out of contact with the interconnector contacts 34a therein, and are also positioned in the compartments to be moved into contact with the respective interconnector contacts upon insertion of the blade of a utility plug through the plug-in opening 31 of each of the respective compartments. The electrical circuit is thus completed in the compartment from the terminal portion of the interconnector contact 34a through the auxiliary contact 38 and the blade of the utility plug inserted into the compartment. When the plug is withdrawn, the resilient auxiliary contact 38 moves away from the outlet terminal portion of the interconnector contact by its own resiliency and the circuit is broken at that point.

In installing the outlet receptacle device in the illustrated wiring system, the several electrical conductors may be pushed through the tubular receiving passage of the connector portions 34a of the respective interconnector contacts 34 until such contacts are positioned thereon as required; after which the usual insulating sleeves may be slipped onto the conductors, as shown. Or, more conveniently, the several conductors may be cut as required, the cut ends being inserted into the tubular receiving passages of the connector portions 34a, from opposite ends thereof, to establish the required electrical and mechanical continuity of the system.

Whereas the invention has been here illustrated and described with respect to only one embodiment thereof, it should be understood that various changes may be made in said embodiment and various other embodiments thereof may be constructed by those skilled in the art, without departing from the spirit and generic purview of the invention as defined by the following claims.

We claim:

1. An electrical outlet receptacle comprising a longitudinally compartmented block of insulating material having pairs of plug-in openings in the front wall thereof, one opening of each pair giving access to one compartment within said block and the other opening of that pair giving access to an adjacent compartment therein; a neutral electrical conductor extending along one-side-wall of said block; two "live" electrical conductors extending along the other side-wall of said block; two electrical interconnector contacts adjustably fixed to said neutral electrical conductor and extending therefrom through side-wall slots into two compartments in said block; and an electrical interconnector contact adjustably fixed to each of said "live" electrical conductors and extending therefrom through side-wall slots into compartments in said block respectively adjacent the compartments into which said interconnector contacts fixed to said neutral electrical conductor extend, whereby a pair of contact blades inserted in a pair of plug-in openings may make electrical contact with electrical interconnectors fixed respectively to said neutral electrical conductor and to one of said "live" electrical conductors.

2. An electrical outlet receptacle comprising a longitudinally compartmented block of insulating material having pairs of plug-in openings in the front wall thereof, one opening of each pair giving access to one compartment within said block and the other opening of that pair giving access to an adjacent compartment therein; a neutral electrical conductor extending along one side-wall of said block; two "live" electrical conductors extending along the other side-wall of said block; two electrical interconnector contacts adjustably fixed to said neutral electrical conductor and extending therefrom through side-wall slots into two compartments in said block; and an electrical interconnector contact adjustably fixed to each of said "live" electrical conductors and extending therefrom through side-wall slots into compartments in said block respectively adjacent the compartments into which said interconnector contacts fixed to said neutral electrical conductor extend; in combination with an auxiliary resilient contact held in each compartment out of contact with the interconnector contact therein and positioned to be moved into contact with the interconnector contact upon insertion of the blade of a utility plug through the plug-in opening into that compartment, whereby a pair of contact blades inserted in a pair of plug-in openings may make electrical contact with electrical interconnectors fixed respectively to said neutral electrical conductor and to one of said "live" electrical conductors.

JOSEPH F. O'BRIEN.
EARL S. BOYNTON.

REFERENCES CITED

The following references are of record in the file of this patent:

UNITED STATES PATENTS

| Number | Name | Date |
| --- | --- | --- |
| 988,018 | Newton | Mar. 28, 1911 |
| 1,857,378 | Hubbell | May 10, 1932 |
| 2,058,745 | Weber | Oct. 27, 1936 |
| 2,087,004 | Quanstrom | July 13, 1937 |
| 2,088,845 | De Mask | Aug. 3, 1937 |
| 2,351,631 | O'Brien | June 20, 1944 |